(12) United States Patent
Chapman et al.

(10) Patent No.: US 12,519,902 B2
(45) Date of Patent: Jan. 6, 2026

(54) RF PASS BAND NOTCH REMOVAL IN BROADBAND SIGNAL TAPS

(71) Applicant: TECHNETIX B.V., Veenendaal (NL)

(72) Inventors: Paul Chapman, West Sussex (GB); Gareth Shelley, West Sussex (GB)

(73) Assignee: TECHNETIX B.V., Veenendaal (NL)

( * ) Notice: Subject to any disclaimer, the term of this patent is extended or adjusted under 35 U.S.C. 154(b) by 327 days.

(21) Appl. No.: 18/239,918

(22) Filed: Aug. 30, 2023

(65) Prior Publication Data

US 2024/0137460 A1 Apr. 25, 2024
US 2024/0236265 A9 Jul. 11, 2024

(30) Foreign Application Priority Data

Oct. 20, 2022 (GB) ...................................... 2215524

(51) Int. Cl.
*H04N 7/10* (2006.01)
*H01P 5/19* (2006.01)

(52) U.S. Cl.
CPC .............. *H04N 7/104* (2013.01); *H01P 5/19* (2013.01)

(58) Field of Classification Search
CPC ... H04N 7/104; H01P 5/19; H01P 5/00; H01P 5/12; H01R 24/54; H01R 13/646; H01R 13/658; H05K 5/03
USPC ...................................................... 333/100
See application file for complete search history.

(56) References Cited

U.S. PATENT DOCUMENTS

| 5,756,935 | A | | 5/1998 | Balanovsky et al. | |
|---|---|---|---|---|---|
| 5,909,154 | A | | 6/1999 | Brown et al. | |
| 5,994,976 | A | * | 11/1999 | Tang | H01R 9/0506 333/100 |
| 6,580,336 | B1 | * | 6/2003 | Gerszberg | H01R 24/542 333/100 |
| 6,593,830 | B2 | * | 7/2003 | Wu | H01R 24/46 725/127 |
| 2008/0107016 | A1 | * | 5/2008 | Tang | H01R 24/46 370/217 |
| 2018/0254538 | A1 | * | 9/2018 | Palawinna | H05K 5/03 |

FOREIGN PATENT DOCUMENTS

JP  2022024220 A  2/2022

\* cited by examiner

*Primary Examiner* — Tulsidas C Patel
*Assistant Examiner* — Carlos E Lopez-Pagan
(74) *Attorney, Agent, or Firm* — SZDC Law PC

(57) ABSTRACT

There is provided a broadband signal tap (10) comprising a housing (12) and a cover (14) adapted to be removable from and attachable to the housing (12), the housing (12) comprising a power continuity connector (24) and the cover (14) comprising at least one external subscriber port (16), wherein at least one electrically conductive pad (32, 34) is disposed within the housing (12) to physically and electrically contact the housing (12) and the power continuity connector (24) and so remove resonant effects. The at least one electrically conductive pad (32, 34) comprises a first portion (56, 62) for engaging with the housing and a second portion (58, 60) for engaging with the power continuity connector (24). A cover (14) incorporating at least one electrically conductive pad (32, 34) is also provided.

13 Claims, 3 Drawing Sheets

RF PASS BAND NOTCH REMOVAL IN BROADBAND SIGNAL TAPS

This application claims priority to United Kingdom Patent Application No. GB 2215524.6, filed on Oct. 20, 2022, which is incorporated by reference for all purposes as if fully set forth herein.

FIELD OF THE INVENTION

This invention relates to a broadband signal tap of the type used in cable television and broadband networks, and in particular to removal of notches in the RF pass band signal of such taps.

BACKGROUND TO THE INVENTION

To address demand for transport of increasing amounts of broadband data over communication networks, broadband and cable television network operators need to upgrade their networks to extend the operating frequency range and so increase the bandwidth. When upgrading networks, it is preferred to preserve and re-use existing infrastructure to reduce the overall cost of the upgrade.

For signal taps, such as line distribution taps, increasing the bandwidth is usually achieved by replacing the existing face plate of the tap with an upgraded face plate designed to work for a higher range of frequencies, typically 1218 MHz, 1800 MHz and higher. However at these higher frequencies resonant effects occur with the components situated in the unmodified tap back box and this degrades signals passing through the tap which is undesirable.

SUMMARY OF THE INVENTION

In accordance with the first aspect of the invention, there is provided a broadband signal tap comprising a housing, typically a back box, and a cover, typically a face plate, adapted to be removable from and attachable to the housing, the housing comprising a power continuity connector, such as a power pass bar, and the cover comprising at least one external subscriber port, wherein at least one electrically conductive pad is disposed within the housing to physically and electrically contact the housing and the power continuity connector, thus providing an electrical connection between the power continuity connector and ground to prevent resonance occurring between electrical components situated in the housing and electrical components situated in the cover.

Preferably the at least one electrically conductive pad comprises a first portion for engaging with the housing and a second portion for engaging with the power continuity connector. This may be achieved by contouring or otherwise shaping the pad to provide the first and second portions.

The first portion may provided by a first set of protrusions and the second portion provided by a second set of protrusions, the first set of protrusions being longer than the second set of protrusions so as to accommodate variations in height between the housing and the power continuity bar.

Alternatively the at least one electrically conductive pad may be tubular with a cut-away portion so as to provide different length first and second portions.

The at least one electrically conductive pad is preferably secured to one end of a support structure, the other end of the support structure being secured to the cover, so assisting correct positioning of the pad within the housing and ensuring the pad is not inadvertently omitted during replacement of the cover.

The electrically conductive pad may have a resistivity up to 4000 Ohms to provide a resistive connection to earth yet still eliminate resonant effects.

Preferably the electrically conductive pad has a resistivity in the range 200 to 4000 Ohms.

The electrically conductive pad may be made from flexible plastics material being able to spread onto and connect between different areas so as to overcome variations in assembly component positioning.

Two electrically conductive pads may be disposed within the housing, the electrically conductive pads being spaced apart and arranged to contact opposing electrically conductive ends of the power continuity connector.

The invention also lies in a cover for a broadband signal tap adapted to be removable from and attachable to a tap housing, the cover comprising at least one external subscriber port and at least one support structure, wherein an electrically conductive pad is secured to the at least one support structure so as to be able to physically contact both the tap housing and a power continuity connector positioned within the tap housing.

The electrically conductive pad preferably comprises a first portion for engaging with the tap housing and a second portion for engaging with the power continuity connector.

The first portion may be provided by a first set of protrusions and the second portion provided by a second set of protrusions, the first set of protrusions being longer than the second set of protrusions. Alternatively the at least one electrically conductive pad may be tubular with a cut away portion.

The electrically conductive pad preferably has a resistivity up to 4000 Ohms to provide a resistive connection to earth yet still eliminate resonant effects, and preferably has a resistivity in the range 200 to 4000 Ohms.

Two support structures may be provided with one electrically conductive pad disposed at one end of each support structure.

The invention will now be described, by way of example, with reference to the accompanying drawings in which.

DESCRIPTION

Figure 1:
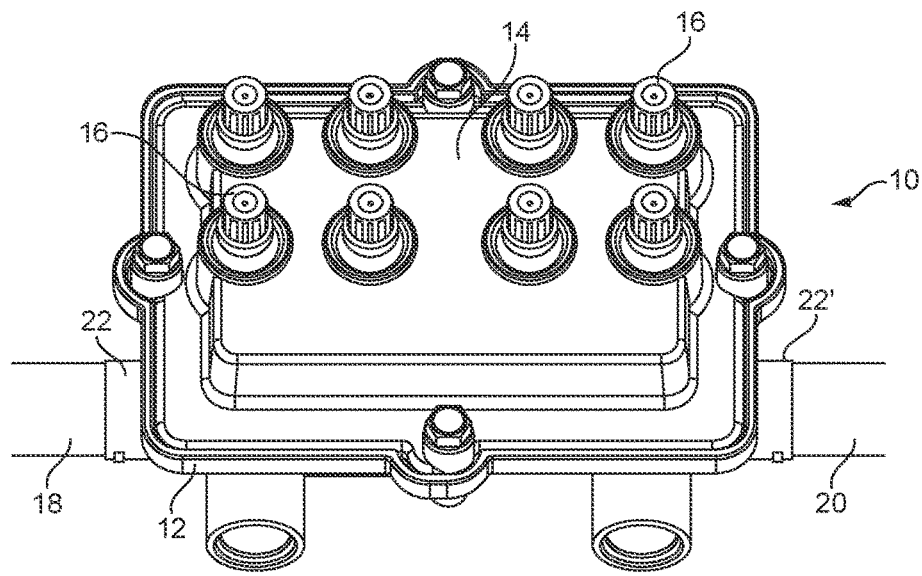
FIG. 1 shows a perspective view of a broadband signal tap.

FIG. 1 shows a prior art cable tap 10 comprising housing or back box 12 and face plate cover 14 with a plurality of external subscriber ports 16. Tap 10 is positioned within a cable, broadband or CATV network, with a coaxial network connection 18, 20 secured to cable ports 22, 22' of back box 12 to supply power and a bi-directional signal. A broadband signal is routed through the CATV network, branching at multiple points to provide bi-directional signal communication between subscribers and a head end operated by the network provider.

Figure 2:
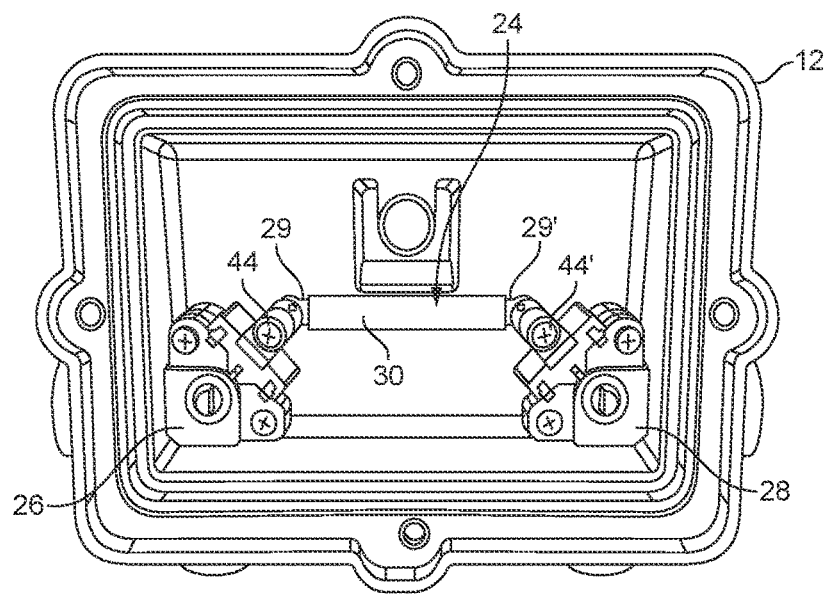
FIG. 2 shows a plan view of a back box forming part of the signal tap.

As back boxes are connected into the network power supply through ports 22, 22', it is difficult and time consuming to replace them when upgrades are required and so generally only face plate 14 will be replaced to expand the operating frequency range of the CATV signal. Therefore each back box includes a power continuity bar 24, see FIG. 2, which ensures that the through signal path and current path between input and output connectors 26, 28 within back box 12 is maintained when face plate 14 is removed. Power continuity bar 24 comprises non-insulated exposed ends 29, 29' and a central insulated section 30.

Figure 3:
FIG. 3 shows a graph depicting resonant effects occurring in an unmodified broadband signal tap.

When face plate 14 is secured to back box 12, mechanical switches on input and output connectors 26, 28 redirect the signal and power path through a printed circuit board (PCB) forming part of face plate 14 and disconnect power pass bar 24. Power pass bar 24 is left electrically "floating" and when updating face plates with newer face plates designed for a different frequency range, resonant effects can occur as shown in FIG. 3 where a graph of insertion loss against frequency shows a resonant effect occurs at a frequency of 1288 MHz as shown by a notch in the signal at point 31. The resonant effect degrades the signal characteristics and occurs because disconnected power pass bar 24 forms a resonant circuit with the terminal of connectors 26, 28 and components within face plate 14.

Figure 4:
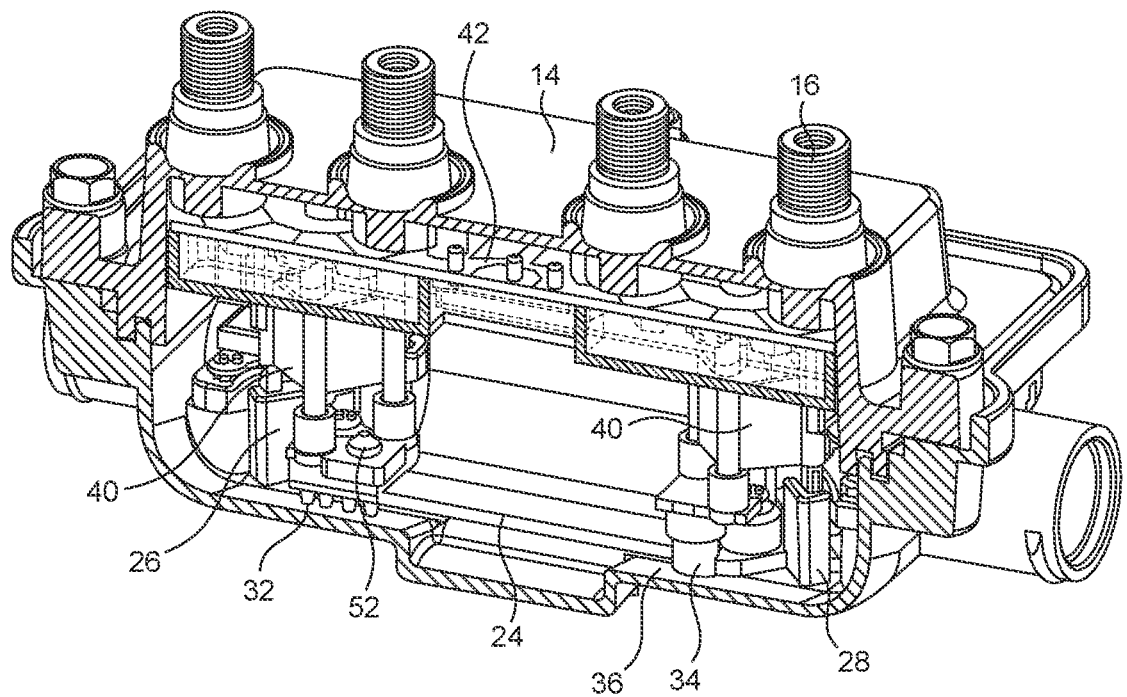
FIG. 4 shows a cut-away view through a modified signal distribution tap incorporating electrically conductive pads.

A cut-way view of a modified cable tap is shown in FIG. 4 where electrically conductive pads 32, 34 are each respectively disposed in physical and electrical contact with one of the electrically conductive ends 29, 29' of power continuity bar 24 and with conductive surface 36 of back box 12. Pads 32, 34 thus provide an electrical connection between power pass bar 24 and ground. This prevents resonance occurring between electrical components situated in back box 12 and electrical components situated on face plate 14.

Conductive pads 32, 34 are each disposed at the end of an electrically insulating support structure 40 which is attached to face plate 14, generally being connected to PCB 42 located within face plate 14. Each support structure 40 is typically formed from plastics material and can be in the form of a simple insulating sheath or a support frame as shown in FIG. 4. Each support structure 40 provides a boss which sits on and depresses one of switch elements 44, 44'. When face plate 14 is removed from back box 12, switch elements 44, 44' are released to maintain current flow through power bar 24 rather than through PCB 42 and face plate 14.

Whilst two electrically conductive pads 32, 34 are shown, a single pad can be used instead and if desired pads 32, 34 can be manually introduced into back box 12 before attachment of face plate 14. However combining pads 32, 34 with face plate 14 by attaching them to the end of support structures 40 provides for correct positioning and ensures the pads are not inadvertently omitted during replacement of face plate 14.

Electrically conductive pads 32, 34 are made of a material, such as a carbon-filled silicone elastomer, with a resistivity up to 4000 Ohms to provide a resistive connection to earth yet still eliminate resonant effects. By providing a resistive connection, the signal passing through power pass bar 24 when face plate 14 is removed will not be substantially reduced or degraded if conductive pad 32, 34 inadvertently makes contact with power pass bar 24 whilst bar 24 is still electrically connected, i.e. before face plate connectors or bosses associated with support structure 40 prevent power passing through power bar 24. A resistivity in the range 200 to 4000 Ohms is particularly preferred to improve safety and ensure the network power cannot be shorted out by inadvertent contact of a conductive pad with the non-insulated part of power pass bar 24 during fitting of face plate 14 and before switch elements 44, 44' are fully depressed to prevent power flow through bar 24.

Figure 5:
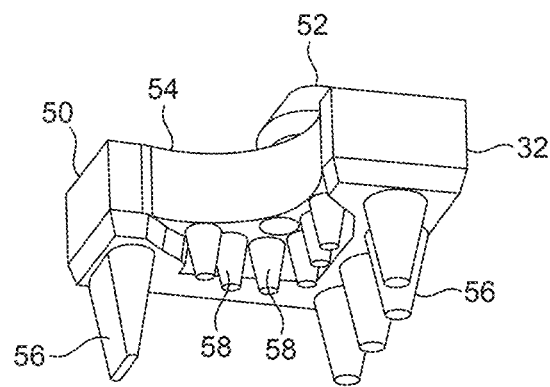
FIG. 5 shows a first embodiment of a conductive pad.
Figure 6:
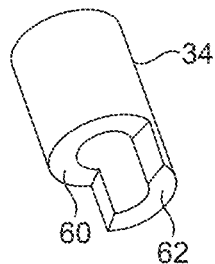
FIG. 6 shows a second embodiment of a conductive pad.

The or each conductive pad 32, 34 is made of flexible plastics material being able to spread onto and connect between different height and shaped areas, so as overcoming the wide variations in assembly component positioning tolerances found in these devices. Conductive pads 32, 34 can be contoured to best fit the shape of the exposed conductive surfaces of power pass bar 24 and back box 12, or made of flexible malleable connected parts so as to accommodate variations in positioning and shape of conductive elements in back box 12 whilst still making electrical connections. Two embodiments of electrically conductive pads 32, 24 are shown in FIGS. 5 and 6, although other shapes are possible. FIG. 4 shows the use of one of each embodiment although identical pads would usually be used within any given tap.

The embodiment shown in FIG. 5 comprises a flexible malleable pad 32 comprising a base portion 50 with a spigot 52 on upper face 54 and a plurality of integrally formed downwardly depending protrusions 56, 58. Spigot 52 is configured for push-fit engagement with an aperture in support structure 40 so as to secure pad 32 to support structure 40. Two sets of protrusions are provided, first set 56 formed as longer protrusions to engage with rear wall 36 of back box 12 and second set 58 formed as shorter protrusions engaging with power bar 24 which is disposed above and spaced from rear wall 36 of back box 12 and as such is set at a different height to rear wall 36. By having two sets of protrusions of different lengths, the different heights of power bar 24 and rear wall 36 relative to face plate 14 can be compensated for.

FIG. 6 shows an alternative embodiment which can be used instead of or in combination with pad 32 as shown in FIG. 5. In FIG. 6, pad 34 is tubular with a cut away section so as to provide a shorter portion 60 for engaging with power bar 24 and a longer portion 62 for engaging with rear wall 36.

Figure 7:
FIG. 7 shows a graph depicting the removal of resonant effects when the tap is fitted with one or more conductive pads.

The removal of the resonance effect which results from fitting conductive pads 32, 24 within tap housing 10 can be seen in FIG. 7, where notch 31 in the pass band seen in FIG. 3 has been removed.

The invention claimed is:

1. A broadband signal tap comprising a housing and a cover adapted to be removable from and attachable to the housing, the housing comprising a power continuity connector and the cover comprising at least one external subscriber port, wherein at least one electrically conductive pad is disposed within the housing to physically and electrically contact the housing and the power continuity connector;

wherein the at least one electrically conductive pad comprises a first portion for engaging with the housing and a second portion for engaging with the power continuity connector; and wherein the first portion is provided by a first set of protrusions and the second portion is provided by a second set of protrusions, the first set of protrusions being longer than the second set of protrusions.

2. A broadband signal tap according to claim 1, wherein the at least one electrically conductive pad is tubular with a cut-away portion.

3. A broadband signal tap according to claim 1, wherein the electrically conductive pad is secured to one end of a support structure, the other end of the support structure being secured to the cover.

4. A broadband signal tap according to claim 1, wherein the at least one electrically conductive pad has a resistivity up to 4000 Ohms.

5. A broadband signal tap according to claim 1, wherein the at least one electrically conductive pad has a resistivity in the range 200 to 4000 Ohms.

6. A broadband signal tap according to claim 1, wherein the at least one electrically conductive pad is made from flexible plastics material.

7. A broadband signal tap according to claim 1, wherein two electrically conductive pads are disposed within the housing, the electrically conductive pads being spaced apart and arranged to contact opposing electrically conductive ends of the power continuity connector.

8. A cover for a broadband signal tap adapted to be removable from and attachable to a tap housing, the cover comprising at least one external subscriber port and at least one support structure,
   wherein an electrically conductive pad is secured to the at least one support structure so as to be able to physically and electrically contact both the tap housing and a power continuity connector positioned within the tap housing;
   wherein the electrically conductive pad comprises a first portion for engaging with the tap housing and a second portion for engaging with the power continuity connector; and
   wherein the first portion is provided by a first set of protrusions and the second portion is provided by a second set of protrusions, the first set of protrusions being longer than the second set of protrusions.

9. A cover according to claim 8, wherein the electrically conductive pad is tubular with a cut away portion.

10. A cover according to claim 8, wherein the electrically conductive pad has a resistivity up to 4000 Ohms.

11. A broadband signal tap according to claim 8, wherein the electrically conductive pad has a resistivity in the range 200 to 4000 Ohms.

12. A cover according to claim 8, wherein the electrically conductive pad is made from flexible plastics material.

13. A cover according to claim 8, wherein two support structures are provided with one electrically conductive pad disposed at one end of each support structure.

\* \* \* \* \*